United States Patent
Drevon et al.

(10) Patent No.: US 10,390,188 B2
(45) Date of Patent: Aug. 20, 2019

(54) METHOD FOR THE MANAGEMENT OF SHORT MESSAGE DELIVERY IN A MOBILE COMMUNICATION SYSTEM

(75) Inventors: Nicolas Drevon, Nozay (FR); Laurent Thiebaut, Nozay (FR); Alessio Casati, West Molesey (GB)

(73) Assignee: Alcatel Lucent, Nozay (FR)

(*) Notice: Subject to any disclaimer, the term of this patent is extended or adjusted under 35 U.S.C. 154(b) by 1394 days.

(21) Appl. No.: 12/999,830

(22) PCT Filed: Jun. 16, 2009

(86) PCT No.: PCT/EP2009/057460
§ 371 (c)(1),
(2), (4) Date: Mar. 21, 2011

(87) PCT Pub. No.: WO2009/153257
PCT Pub. Date: Dec. 23, 2009

(65) Prior Publication Data
US 2011/0165898 A1    Jul. 7, 2011

(30) Foreign Application Priority Data

Jun. 18, 2008  (EP) .................................. 08290580
Aug. 11, 2008  (EP) .................................. 08305461

(51) Int. Cl.
*H04W 4/12*    (2009.01)
*H04W 4/14*    (2009.01)
(Continued)

(52) U.S. Cl.
CPC ............... *H04W 4/12* (2013.01); *H04W 4/14* (2013.01); *H04W 8/04* (2013.01); *H04W 8/12* (2013.01); *H04W 12/06* (2013.01)

(58) Field of Classification Search
CPC ....... H04W 36/00; H04W 12/06; H04W 8/12; H04W 8/04; H04W 4/14; H04W 4/12
(Continued)

(56) References Cited

U.S. PATENT DOCUMENTS 6,259,925 B1 * 7/2001 Josse ....................... H04W 4/12
                                                         455/411
7,058,036 B1 * 6/2006 Yu et al. ....................... 370/335
(Continued)

FOREIGN PATENT DOCUMENTS

CN         1279864 A    1/2001
CN         1852323 A    10/2006
(Continued)

OTHER PUBLICATIONS

International Search Report for PCT/EP2009/057460 dated Aug. 27, 2009.
(Continued)

*Primary Examiner* — Margaret G Mastrodonato
(74) *Attorney, Agent, or Firm* — Fay Sharpe LLP

(57) ABSTRACT

In one aspect, there is provided a method for the management of Short Message SM delivery in a mobile communication system comprising an Overlaying, e.g. IP-based or CS fallback in Evolved Packet System based, SM delivery network accessed via a mobile or fixed Access Network AN which is transparent to the Overlaying SM Delivery procedure, said method comprising, in an embodiment:

informing an AN entity capable of detecting User Equipment UE activity over said AN, of unsuccessful SM delivery attempt due to not reachable UE, upon detection of UE activity over said AN for said UE, said AN entity informing an entity in charge of requesting new SM delivery attempt when said UE is again reachable.

34 Claims, 8 Drawing Sheets

(51) Int. Cl.
*H04W 8/04* (2009.01)
*H04W 8/12* (2009.01)
*H04W 12/06* (2009.01)
*H04Q 7/20* (2006.01)

(58) Field of Classification Search
USPC ..................................... 455/446, 560, 552.1
See application file for complete search history.

(56) References Cited

U.S. PATENT DOCUMENTS

| | | | |
|---|---|---|---|
| 7,120,455 B1 * | 10/2006 | Chen ....................... | H04L 51/04 455/414.1 |
| 8,782,255 B2 | 7/2014 | Thiebaut et al. | |
| 2005/0181766 A1 | 8/2005 | Rooke et al. | |
| 2007/0223428 A1 | 9/2007 | Patterson et al. | |
| 2008/0176589 A1 * | 7/2008 | Bantukul ................ | H04W 8/12 455/466 |
| 2009/0047947 A1 * | 2/2009 | Giaretta et al. ............ | 455/432.1 |
| 2009/0323636 A1 * | 12/2009 | Dillon ............... | H04L 29/12188 370/331 |

FOREIGN PATENT DOCUMENTS

| | | |
|---|---|---|
| EP | 0937365 A2 | 8/1999 |
| WO | WO 9809464 A2 * | 3/1998 |
| WO | WO 99/26432 A | 5/1999 |
| WO | WO 03/094553 A | 11/2003 |

OTHER PUBLICATIONS

Fujitsu. "Addition of Mobile Not Reachable Flag to IP-Message-GW" S2-050375, 3GPP, Feb. 2, 2005, pp. 1-7.

Qualcomm Europe. "Deferred message when SMS is transport or service level interworked", S2-083052, 3GPP, Apr. 11, 2008, pp. 1-3.

T-Mobile. "SMS support in CS Fallback for EPS", S2-084281, 3GPP, May 16, 2008., pp. 1-8.

"3$^{rd}$ Generation Partnership Project; Technical Specifation Group Terminals; Technical realization of the Short Message Service (SMS) (release 4)," 3GPP TS 23.040, No. V4.10.0, Jun. 1, 2008, pp. 1-128.

* cited by examiner

FIG_1
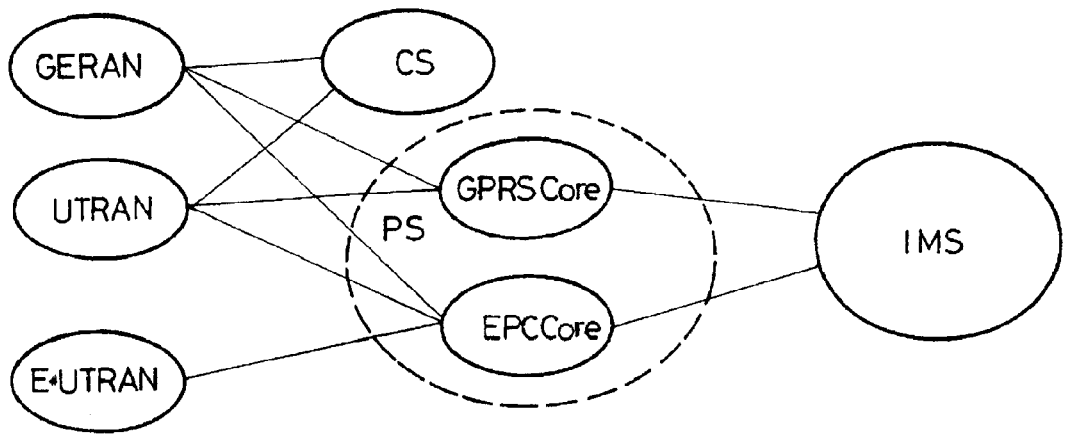
FIG_2
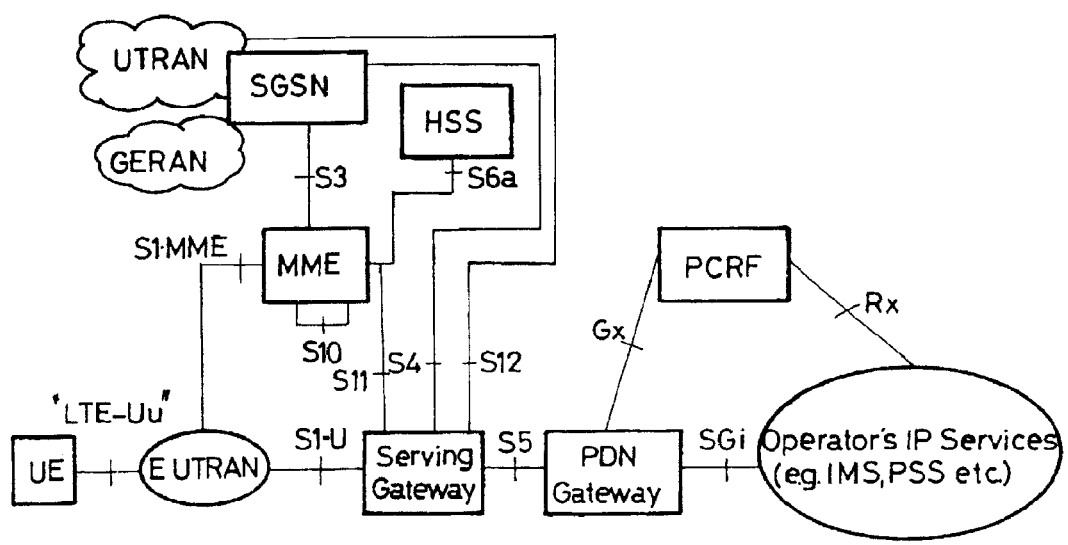

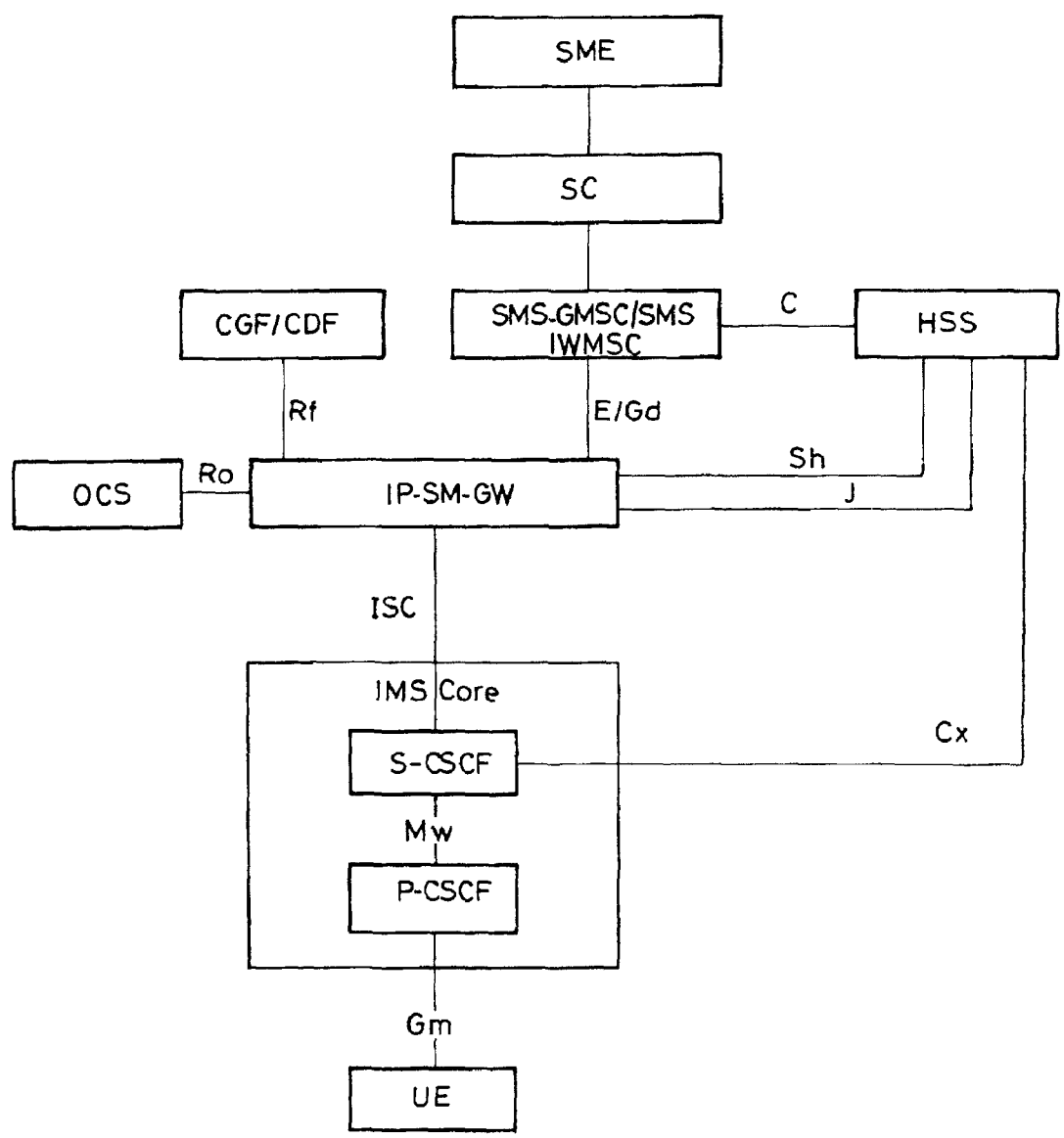
FIG_3

FIG_3BIS
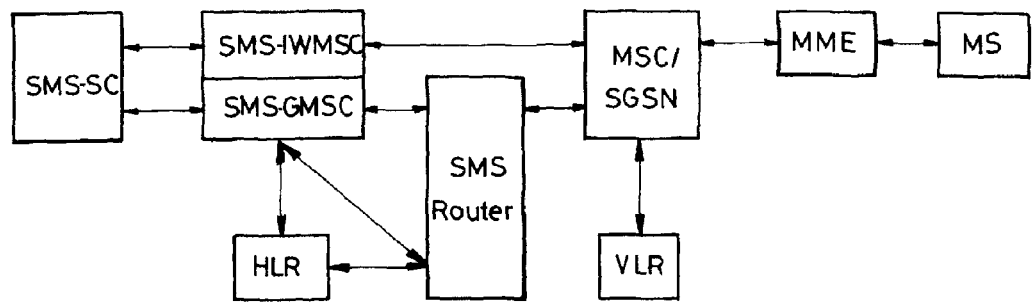
FIG_4BIS
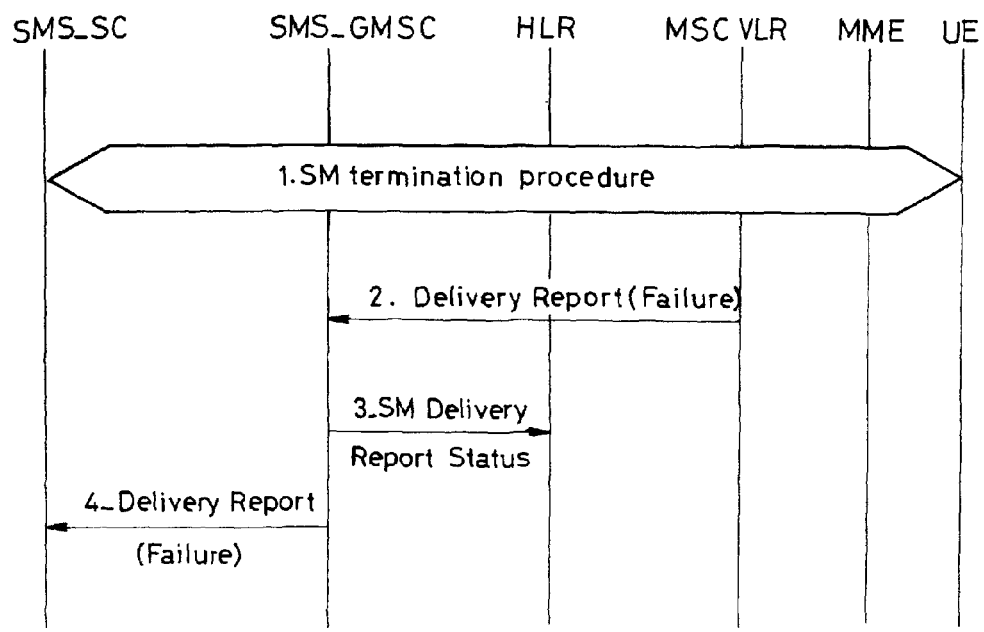

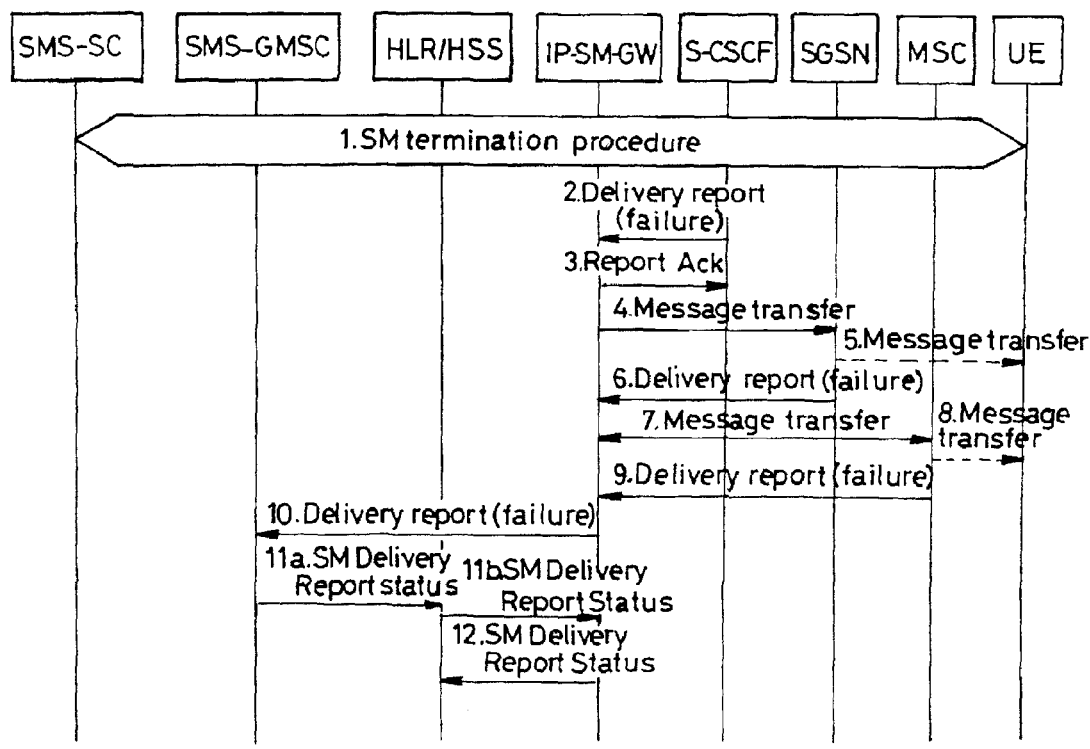
FIG_4

FIG_5
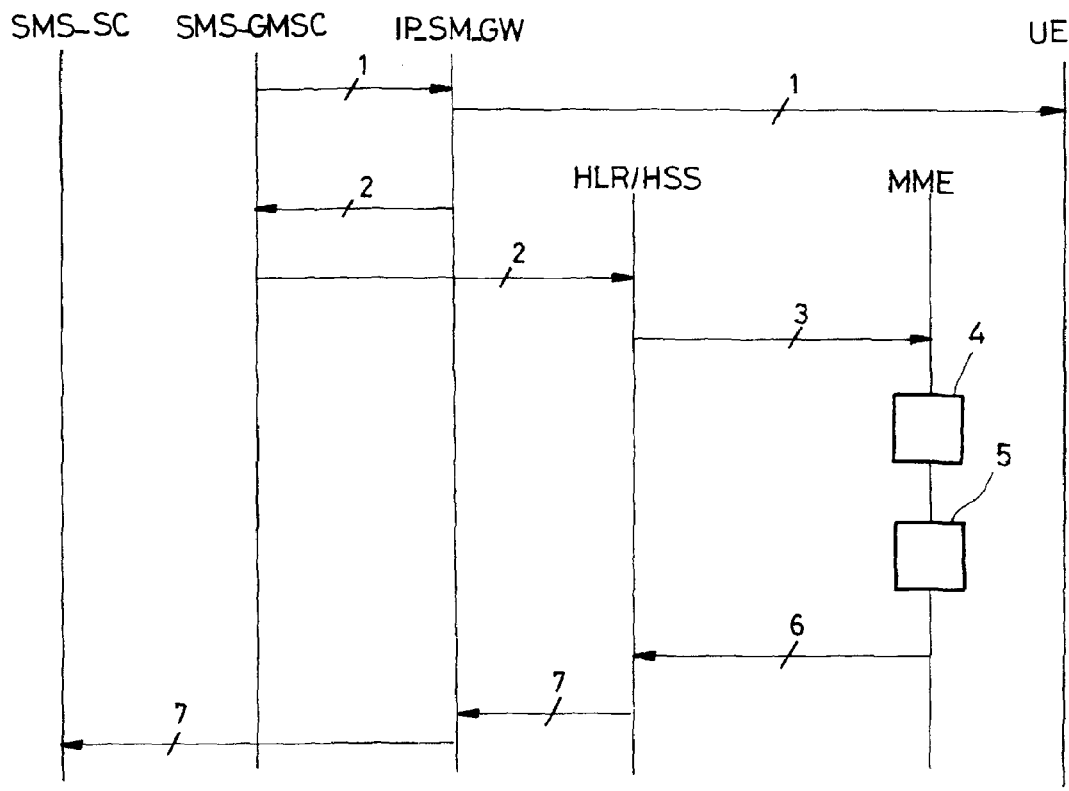
FIG_5bis
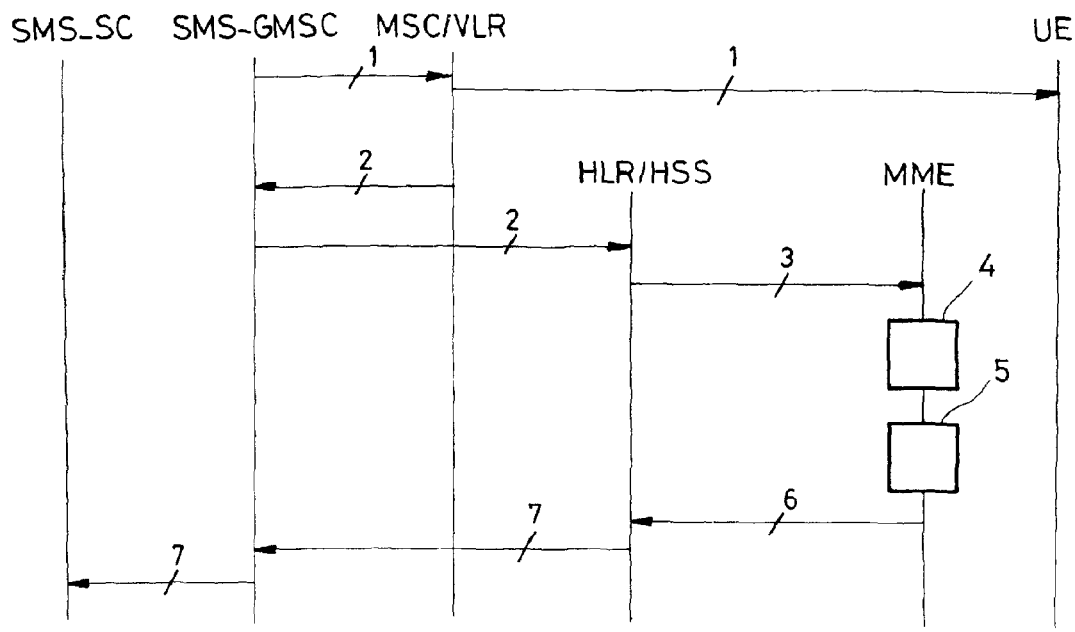

FIG_6
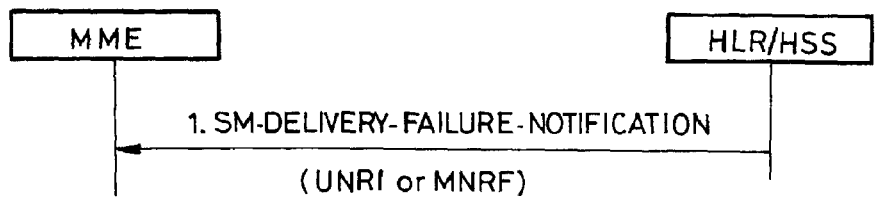
FIG_7
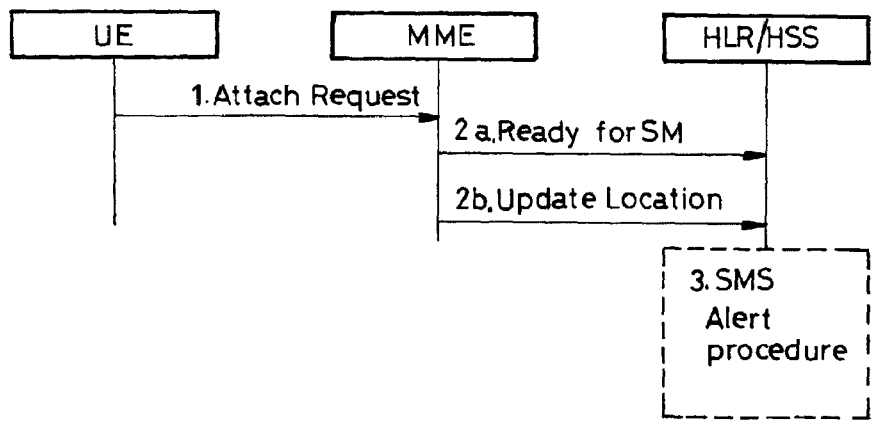
FIG_8
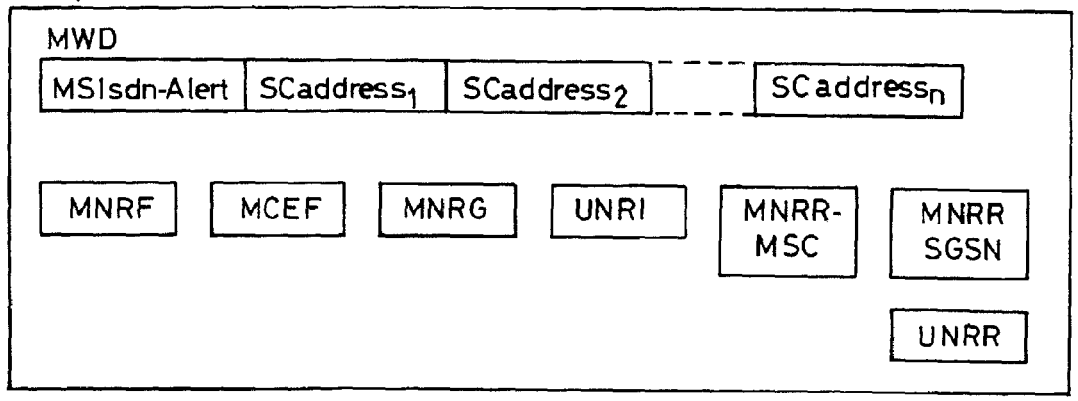
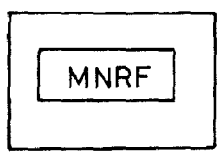
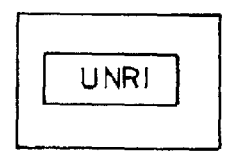
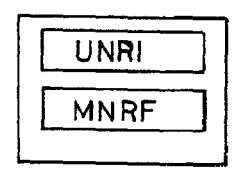

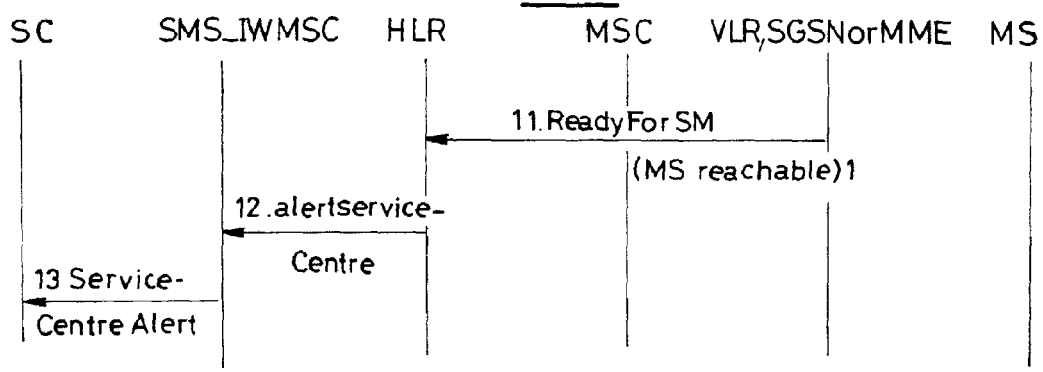
FIG_9
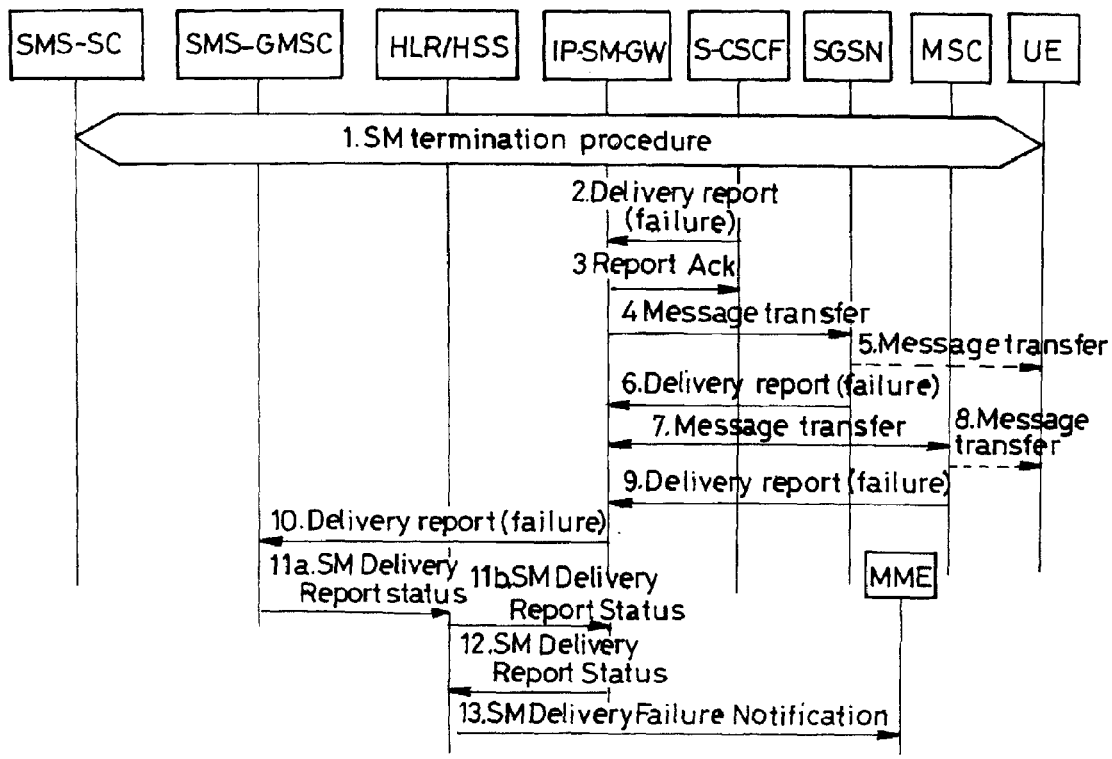
FIG_10
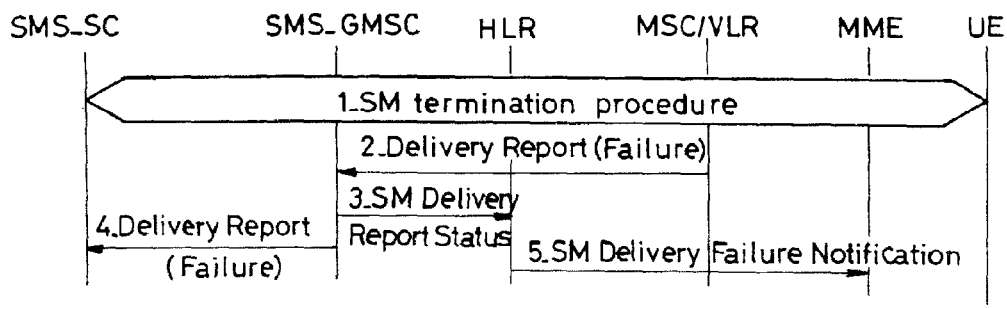
FIG_10BIS

FIG_11
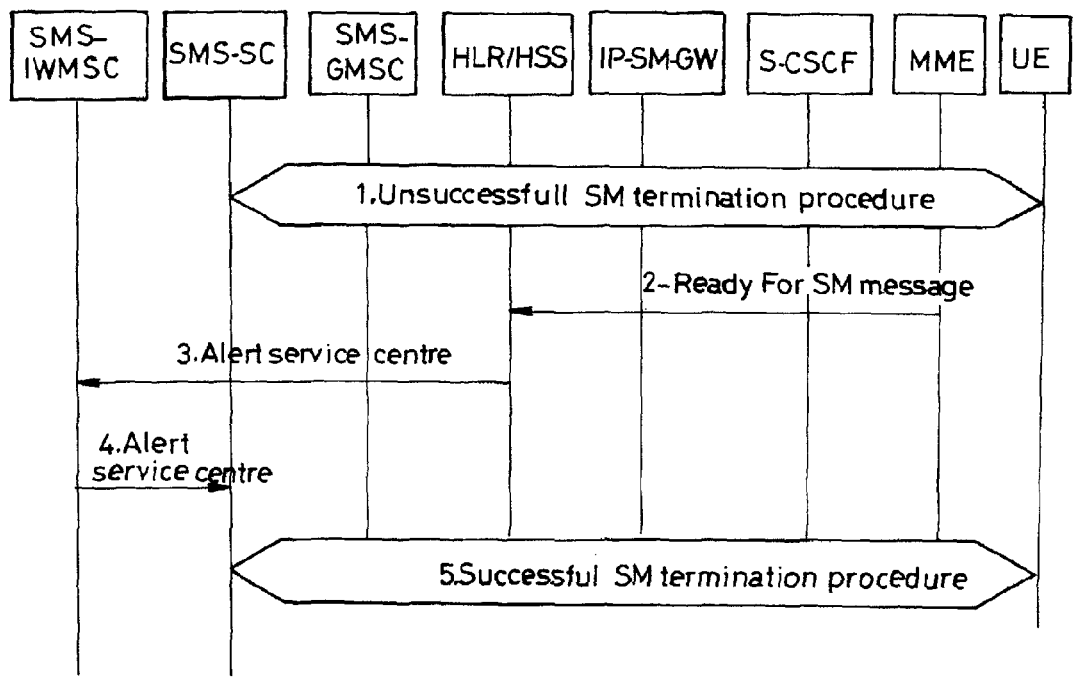
FIG_11 BIS
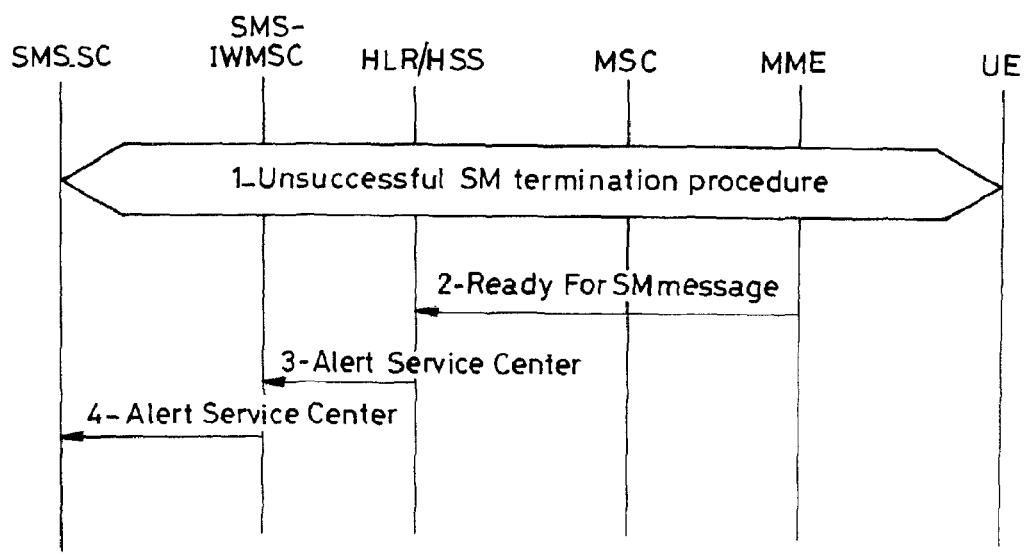

METHOD FOR THE MANAGEMENT OF SHORT MESSAGE DELIVERY IN A MOBILE COMMUNICATION SYSTEM

CROSS-REFERENCE TO RELATED APPLICATIONS

This application is a U.S. national filing of PCT Application No. PCT/EP2009/057460 and is based on European Patent Applications No. 08290580.3 filed Jun. 18, 2008, and 08305461.9 filed Aug. 11, 2008, the disclosure of which is hereby incorporated by reference thereto in its entirety, and the priority of which is hereby claimed.

FIELD OF THE INVENTION

The present invention generally relates to mobile communication networks and systems.

BACKGROUND

Detailed descriptions of mobile communication networks and systems can be found in the literature, in particular in Technical Specifications published by standardisation bodies such as for example 3GPP ($3^{rd}$ Generation Partnership Project).

In such systems, a Mobile Station (MS) or User Equipment (UE) has access to mobile services via an Access Network (AN). The Access Network (AN) generally comprises a Radio Access Network (RAN) and a Core Network (ON).

There are different types of RANs, based on different types of Radio Access Technologies, such as for example: GSM/GPRS RAN (also called GERAN), UMTS RAN (also called UTRAN), LTE RAN (also called E-UTRAN), WLAN, WIMAX, . . . etc.

Different types of mobile services can be delivered to end users, such as in particular CS (Circuit Switched) based services, PS (Packet Switched) based services, and IP (Internet Protocol) based services such as IMS (IP Multimedia Subsystem) services. The Core Network (CN) therefore comprises different domains and subsystems such as CS domain, PS domain (also called GPRS), Evolved Packet Core (EPC), IMS subsystem.

Different examples of Access Networks formed of different RANs and CN domains and/or subsystems are illustrated in FIG. 1. The architecture for EPC is specified in particular in 3GPP TS 23.401 and recalled in FIG. 2 taken from this specification.

SUMMARY

An example of mobile services which will more particularly be considered in the following is the delivery of Short Message (SM) from/to MS or UE.

An example of Short Message delivery is the SMS (Short Message Service).

The support of SMS over GSM/UMTS system is specified in particular in 3GPP TS 23.040. In particular, there is specified the capability of the GSM/UMTS system to transfer a short message submitted from a Service Center SC to one MS or UE, and to provide information about the delivery of the short message either by a delivery report or a failure report with a specific mechanism for later delivery.

The support of SMS over a generic IP-based Access Network using IMS capabilities is specified in particular in 3GPP TS 23.204. The corresponding architecture is recalled in FIG. 3, taken from this specification. An IP-Short-Message-Gateway IP-SM-GW provides the protocol interworking for delivery of the short message between the IP-based UE and the SMS-SC.

SMS over IP as specified in 3GPP TS 23.204 is based on IMS signaling. It is transparent to the Access Network (e.g. E-UTRAN and EPC).

When a Short Message (SM) has not been delivered to the user equipment (UE) via IMS signaling, because e.g. the UE is not reachable via IMS, the HLR/HSS and the IP-SM-GW are aware of that non-delivery, store this information (as recalled in FIG. 4 taken from 3GPP TS 23.204), and the HLR/HSS notifies the Short Message Service Center (SM-SC) via the SMS GMSC/SMS-IW-MSC.

The support of SMS in the case of CS Fallback in Evolved Packet System (EPS) is specified in 3GPP TS 23.272 for 1xRTT and GSM/UMTS scenarios. The corresponding architecture is recalled in FIG. 3 bis. The short message is sent from the SMS-GMSC to the MSC/VLR as specified in 3GPP TS 23.040, and the MSC/VLR sends it to the UE according to e.g. 3GPP TS 24.011 protocol across E-UTRAN. The terminations of the 3GPP TS 24.011 protocol are the MSC/VLR and the UE, so that MME and E-UTRAN are transparent to it and only act as relays for the 3GPP TS 24.011 messages. As a result, the MSC/VLR is aware of a non-delivery of a short message, but neither the E-UTRAN nor the MME.

In such contexts, the inventors have recognized that the current state of the standard is not optimum and/or needs to be improved, at least for the following reasons.

In the case of SMS over IP, the only triggers for retrying the SM Delivery is when the UE registers/communicate in IMS again, in which case the HLR/HSS initiates an Alert service centre procedure to the SMS IWMSC that forwards it to the SM-SC (SC in the figure), which sends the SM again.

But in most situations, the UE does not immediately initiate a IMS signaling procedure as soon as the radio coverage is retrieved. Therefore, the SM may be sent only after a long time, even though the UE was already known as reachable by the Access Network for some time.

The same issue occurs in other access technologies where UE mobility does not result in an IP address change. An example is the WLAN technology coupled with Mobile IP IETF mobility mechanisms.

In "SMS over IP" 3GPP specification TS. 23.204, when the delivery of an SMS failed via IMS, the IP-SM-GW also tries to send the SM via the VLR (CS domain) or the SGSN (PS domain) as described in TS 23.040. The main difference, however, is that in 3GPP TS 23.040 the VLR and/or the SGSN participate in the SM delivery procedure whereas in case of pure SMS over P such as in 3GPP TS 23.204, the access network is transparent to the SM delivery procedure. Therefore, it is aware of the outcome of the delivery, and set a flag (MNRF in the VLR, MNRG in SGSN) when the delivery of the SM is unsuccessful. When the UE is detected again in the radio coverage in either CS domain or PS domain, and if the flag is set, the VLR or the SGSN notifies the HLR/HSS that the UE is reachable again (by sending a TS.29.002 Ready-For-SM message). The HLR/HSS initiates an Alert service centre procedure to the SMS IWMSC that forwards it to the SM-SC (SC in the figure), which sends the SM again.

The detection of the presence of the UE under the radio coverage by VLR and/or SGSN is not always immediate, but anyway faster than it is in SMS over IP mechanism. This is because the UE is detected via signaling that is not necessarily IMS signaling, such as most NAS (Non-Access Stratum) TS 24.008 messages from the UE (e.g. IMSI Attach, GPRS Attach, LA/RA Update, CM Service Request, PDP Context Activation Request, etc) and such as an LLC control plane or even user plane message in GERAN-GPRS case.

The prior solution, which consists in trying CS/PS domain SMS delivery as described in TS 23.040 after an unsuccessful delivery via IMS, does not work for E-UTRAN because, unlike GERAN and UTRAN, there is no SMS delivery mechanism not not transparent to the EPS (Evolved Packet System, that includes EPC (Evolved Packet Core) and E-UTRAN (Evolved UTRAN)).

In the case of CS fallback in EPS as specified in TS 23.272, the only trigger for retrying SM delivery is when the MSC/VLR detects the UE since only the MSC/VLR has stored the fact that the SM delivery failed.

The detection of the UE presence in E-UTRAN by the MSC is achieved either in GSM/UMTS or EPS in several situations:

a) when the UE initiates a LA Update procedure that can occur in GSM/UMTS as well as in EPS e.g. within Attach or at combined TA/LA Update procedures, since the MSC/VLR is informed via the SGs interface between the MME and the MSCNLR;

b) for any incoming or outgoing CS domain call. Indeed, in SMS fallback in EPS, the UE is sent to GERAN or UTRAN coverage for any incoming or outgoing CS call when originally camping in E-UTRAN;

c) for any procedure such as Location Services and Call independent Supplementary Services.

However, the UE may remain in E-UTRAN coverage with PS sessions only (e.g. for web-browsing, emails, corporate access, etc.) and will not be detected by the MSC/VLR although it is reachable under that radio access technology and known as reachable by the Mobility Management Entity (MME), which belongs to the Evolved Packet Core (EPC). Therefore, the Short Message may be sent only after a long time, even though the UE is already known as reachable by the Access Network.

Embodiments of the present invention in particular enables to solve such problems and/or to avoid such drawbacks. More generally, it is an object of embodiments of the present invention to improve Short Message delivery in such systems, and thereby improve the quality of service for end users. These and other objects are achieved, in one aspect, in an embodiment, by a method for the management of Short Message SM delivery in a mobile communication system comprising an Overlaying SM delivery network accessed via an Access Network AN which is transparent to the SM Delivery procedure, said method comprising:

- informing an AN entity capable of detecting User Equipment UE activity over said AN, of unsuccessful SM delivery attempt due to not reachable UE,
- upon detection of UE activity over said AN for said UE, said AN entity informing an entity in charge of requesting new SM delivery attempt when said UE is again reachable.

These and other objects are achieved, in another aspect, by a mobile communication system comprising, in an embodiment, means for performing such method.

These and other objects are achieved, in another aspect, by network entities for a mobile communication system (such as for example AN entity (such as MME), and network user database (such as HLR/HSS)) comprising, in an embodiment, means for performing such method.

These and other objects are achieved, in another aspect, by a mobile communication system comprising at least one such network entity.

BRIEF DESCRIPTION OF THE DRAWINGS

Some embodiments of apparatus and/or methods in accordance with embodiments of the present invention are now described, by way of example only, and with reference to the accompanying drawings, in which:

FIG. 1 recalls different examples of Access Networks,

FIG. 2 recalls the general architecture for Evolved Packet Core (EPC),

FIG. 3 recalls the general architecture for SMS over IP,

FIG. 3 bis recalls the general architecture for SMS over CS fallback in EPS,

FIG. 4 recalls the handling of unsuccessful SM termination procedure for SMS over IP, FIG. 4 bis recalls the handling of unsuccessful SM termination procedure for SMS over CS fallback in EPS, FIG. 5 illustrates an embodiment of a method according to the present invention for SMS over IP, FIG. 5 bis illustrates an embodiment of a method according to the present invention for SMS over CS fallback in EPS, FIG. 6 illustrates an SMS Delivery Failure Notification procedure, in an embodiment of the present invention, FIG. 7 illustrates a Mobile User Activity procedure, in an embodiment of the present invention, FIG. 8 illustrates the Messages-Waiting service element, including new mechanisms according to an embodiment of the present invention, FIG. 9 illustrates the Alert SC procedure, including new mechanisms according to an embodiment of the present invention, FIG. 10 is intended to illustrate the Delivery report procedure for SMS over IP, including new mechanisms according to an embodiment of the present invention, FIG. 10 bis is intended to illustrate the Delivery report procedure for SMS over CS fallback in EPS, including new mechanisms according to an embodiment of the present invention, FIG. 11 is intended to illustrate the Short Message Alert procedure for SMS over IP when UE is available, including new mechanisms according to an embodiment of the present invention.

FIG. 11 bis is intended to illustrate the Short Message Alert procedure for SMS over CS fallback in EPS when UE is available, including new mechanisms according to an embodiment of the present invention.

DESCRIPTION OF EMBODIMENTS

In the following description, the case of Overlaying SMS over an AN comprising Evolved Packet Core EPC will more particularly be considered, as an example to which embodiments of the present invention apply. However, it should be understood that the present invention is not limited to such examples.

In an embodiment, the present invention provides that the MME is made aware of the unsuccessful delivery of an SM, then that the MME sets a flag for that UE, in order that the detection of the presence of the UE in E-UTRAN via e.g. most NAS (Non Access Stratum) message from the UE would trigger the sending of a notification (such as Ready-For-SM message) to the HLR/HSS. When the MME sends the notification, it resets its internal flag for that UE.

In an embodiment, as the EPC architecture includes an interface between the MME and the HLR/HSS (S6a), it is proposed to reuse that interface to make the MME aware of the unsuccessful SM delivery.

Moreover, as an option, it would also be possible that the HLR/HSS also sends a notification to the MME to reset the MME flag when a SM has been successfully delivered, but it would not reduce the signaling in the network.

In an embodiment, the following steps are provided, as illustrated in FIG. 5 for SMS over IP:

In step 1, the SM is sent from the SMS-GMSC via the IP-SM-GW via IMS towards the UE as described in TS 23.204.

In step 2, if the delivery is unsuccessful due to UE not reachable, the IP-SM-GW notifies the SMS-GMSC, which in its turn notifies the HLR/HSS as described in TS 23.204.

In step 3, when receiving that notification from the SMS-GMSC, the HLR/HSS sends a notification, called "SM-DELIVERY-FAILURE-NOTIFICATION" message, to the MME that is registered for that UE. The message includes the UNRI (UE not Reachable for IP) parameter already specified in TS 23.040 and TS 23.204. The UNRI states that a SM is waiting to be delivered.

In step 4, when the MME receives this notification with the UNRI set, it stores it.

In step 5, the MME detects that the UE is reachable again via E-UTRAN. The MME can detect that the UE is reachable under E-UTRAN thanks to most NAS messages from the UE.

In step 6, the MME sends a READY-FOR-SM message to the HLR/HSS,

In step 7, the HLR/HSS can then trigger an SM Alert procedure towards the SM-SC, via the IP-SM-GW.

In an embodiment, the following steps are provided, as illustrated in FIG. 5 bis for SMS over CS fallback in EPS:

In step 1, the SM is sent from the SMS-GMSC via the MSC/VLR towards the UE via MME and E-UTRAN that act as relays as described in TS 23.272 and TS 23.040.

In step 2, if the delivery is unsuccessful due to UE not reachable, the MSC/VLR notifies the SMS-GMSC via E-UTRAN and MME that act as relays (and via SMS Router if any). The SMS-GMSC notifies the HLR/HSS as described in TS 23.272 and TS 23.040.

In step 3, when receiving that notification from the SMS-GMSC, the HLR/HSS sends a notification, called "SM-DELIVERY-FAILURE-NOTIFICATION" message, to the MME that is registered for that UE. The message includes the Mobile Station Not Reachable Flag (MNRF) parameter already specified in TS 23.040. The MNRF states that a SM is waiting to be delivered.

In step 4, when the MME receives this notification with the Mobile Station Not Reachable Flag (MNRF) set, it stores it.

In step 5, the MME detects that the UE is reachable again via E-UTRAN. The MME can detect that the UE is reachable under E-UTRAN thanks to most NAS messages from the UE.

In step 6, the MME sends a READY-FOR-SM message to the HLR/HSS,

In step 7, the HLR/HSS can then trigger an SM Alert procedure towards the SM-SC, via the SMS-GMSC.

In another aspect, embodiments of the present invention introduce new mechanisms for SMS over IP for E-UTRAN or SMS over CS fallback in EPS when a SMS was unsuccessfully delivered in order to launch a SMS delivery retry as soon as possible after the UE is available again in E-UTRAN.

In particular, embodiments of the present invention introduce the following mechanisms:

1) A new procedure "SMS-DELIVERY-FAILURE-NOTIFICATION" initiated by the HLR/HSS to make the MME aware of an unsuccessful attempt to deliver a SMS via IP-SM-GW or MSC/VLR over E-UTRAN;

2) The use of "READY-FOR-SM message" in the MME to notify the HLR/HSS when the UE becomes reachable, in order for the SMS-SC to re-send the SMS with the existing mechanisms;

3) The parameters UNRI (UE-Not-Reachable-for-IP) and Mobile Station Not Reachable Flag (MNRF) as specified in 23.040, is introduced in the MME as a copy of the UNRI and MNRF in the HLR/HSS.

In another aspect, embodiments of the present invention introduce new mechanisms in EPC for SMS over IP (EPC architecture being specified in particular in 3GPP TS 23.401) and SMS over CS fallback in EPS (SMS over CS fallback in EPS being specified in 3GPP TS 23.272).

Embodiments of the present invention introduce new procedures, also called Overlaying SMS delivery supplementary procedures, for the retry of SMS delivery when the SMS was not successfully delivered in E-UTRAN via either IP-SM-GWover IP or MSCNLR. In an embodiment, this includes the following two procedures:

SMS Delivery Failure Notification procedure,
Mobile User Activity procedure.

An example of SMS Delivery Failure Notification procedure is illustrated in FIG. 6:

If the HLR/HSS is notified by the SMS-GMSC that a SMS has not been delivered to the UE due to the UE not reachable, it sets the UNRI or the MNRF as described in TS 23.040, and if the UNRI or MNRF state has changed, the HLR/HSS sends a SM-DELIVERY-FAILURE-NOTIFICATION (UNRI=TRUE, or MNRF=TRUE) to the MME. If the MME has an MM context for that user, the MME sets UNRI or MNRF to indicate the need to report to the HLR/HSS when the next contact with that UE is performed.

An example of Mobile User Activity procedure is illustrated in FIG. 7, including the following steps:

1. The MME receives an indication that an UE is reachable, e.g., an Attach Request message from the UE.
2a. If the MME contains an MM context of the UE and UNRI or/and MNRF for that UE is set, the MME shall send a Ready for SM (IMSI, MS Reachable) message to the HLR/HSS and clears UNRI or/and MNRF for that UE.
2b. If the MME does not keep the MM context of the UE, the MME shall send an Update Location message (see clause "GPRS Attach Function") to the HLR/HSS.
3. When the HLR/HSS receives the Ready for SM message or the Update Location message for an UE that has UNRI or/and MNRF set, it triggers the SMS alert procedure as described in TS 23.040 and TS 23.204.

Embodiments of the present invention introduce following new fields in the MM bearer context maintained by the MME:

UNRI (UE Not Reachable for IP) and Mobile Station Not Reachable Flag (MNRF).

In another aspect, embodiments of the present invention introduce new mechanisms in SMS architecture (SMS architecture being specified in particular in 3GPP TS 23.040).

1) Embodiments of the present invention introduces new mechanisms in the Messages-Waiting (MW) service element.

In an embodiment (as illustrated in FIG. 8):

The Messages-Waiting information also comprises the UE-Not-Reachable-for-IP (UNRI) located in the IP-SM-GW and in the MME, and the Mobile Station Not Reachable Flag (MNRF) located in the MSC/VLR and in the MME.

The UE-Not-Reachable-for-IP (UNRI) within the HLR/HSS, the IP-SM-GW and the MME is a Boolean parameter with the value TRUE when the list MWD contains one or more list elements because an attempt to deliver a short message to an UE has failed with a cause of Absent Subscriber, and with the value FALSE otherwise.

The Mobile Station Not Reachable Flag (MNRF) within the HLR/HSS, the MSC/VLR and the MME is a Boolean parameter with the value TRUE when the list MWD contains one or more list elements because an attempt to deliver a short message to an UE has failed with a cause of Absent Subscriber, and with the value FALSE otherwise.

When a mobile terminated short message delivery fails at the IP-SM-GW or at the MSC/VLR due to the MS or UE being temporarily absent, the SC address is inserted into the MWD list (if it is not already present), the UNRI or the MNRF is set (if it is not already set) and the UNRR or the MNRR-MSC is updated (if the information is available). When the UNRI or the MNRF state changes, the HLR/HSS shall send a SM-DELIVERY-FAILURE-NOTIFICATION (UNRI or MNRF) to the MME if any registered for the UE.

When the MME receives a SM-DELIVERY-FAILURE-NOTIFICATION (UNRI or MNRF) from the HLR/HSS on UNRI or MNRF state change (set/cleared), it stores the UNRI or MNRF.

2) Embodiments of the present invention introduce new MME functionalities. In an embodiment, the present invention provides:

When the MME receives a SM-DELIVERY-FAILURE-NOTIFICATION from the HLR/HSS with the UNRI or/and MNRF, it shall store that UNRI or/and MNRF.

When the MS or UE is becoming reachable again, the HLR/HSS is notified of MS or UE being reachable via the MME with "Ready For SM".

3) Embodiments of the present invention introduce new provisions in the SM Alert procedure whereby the Ready For SM message is sent to the HLR/HSS.

In an embodiment, the present invention provides that the Ready For SM (MS reachable) message, step 11 in FIG. 9, provides a means to transfer alert information from VLR, MME or SGSN to HLR/HSS.

The SM Alert procedure is activated when the VLR, the MME or the SGSN detects that the MS or UE is active, e.g. when the MS or UE responds to a paging request.

In another aspect, embodiments of the present invention introduce new mechanisms for SMS over IP architecture for E-UTRAN (SMS architecture over IP being specified in particular in 3GPP TS 23.204) and for SMS over CS fallback in EPS (SMS over CS fallback in EPS being specified in 3GPP TS 23.272).

1) Embodiments of the present invention introduce a new function supported by the HLR/HSS.

In an embodiment, the present invention provides:

If a MME is known in the HLR/HSS for the UE, the HLR/HSS notifies the MME when the UNRI or MNRF state in the HSS has changed.

2) Embodiments of the present invention introduce new provisions in the Delivery report procedure as specified in 3GPP TS 23.204 and shown in FIG. 10 for SMS over IP, and as specified in 3GPP TS 23.040 and shown in FIG. 10 bis for SMS over CS fallback in EPS. Referring to step 11a of FIG. 10 and to step 3 of FIG. 10 bis, in an embodiment, the present invention provides:

If a MME is known in the HLR/HSS for the UE, the HLR/HSS sends a SM-DELIVERY-FAILURE-NOTIFICATION to the MME when the UNRI or MNRF in the HLR/HSS has changed. When the MME receives SM-DELIVERY-FAILURE-NOTIFICATION, it stores the received UNRI or MNRF.

3) Embodiments of the present invention introduce new provisions in the Unsuccessful SM termination procedure as specified in 3GPP TS 23.204 and recalled in FIG. 4 for SMS over IP, and as specified in 3GPP TS 23.040 and recalled in FIG. 4 bis for SMS over CS fallback in EPS. In an embodiment, referring to step 12 of FIG. 4 and to step 3 of FIG. 4 bis, the present invention provides:

The SMS-GMSC sends a new SM Delivery Report Status to the HLR/HSS with accurate results from different domains. The HLR/HSS records the corresponding MWD, i.e. the SMS-SC address which stores the un-delivered message and the failure reason which indicates that the message failed to be sent by IP-SM-GW or the MSC/VLR due to the UE not being available. If a MME is known in the HLR/HSS for the UE, the HSS sends a SM-DELIVERY-FAILURE-NOTIFICATION to the MME when the UNRI or MNRF in the HSS has changed. When the MME receives SM-DELIVERY-FAILURE-NOTIFICATION, it stores the received UNRI or MNRF.

4) Embodiments of the present invention introduce new provisions in the Short Message Alert procedure when UE is available procedure, as specified in 3GPP TS 23.204 and shown in FIG. 11 for SMS over IP, and as specified in 3GPP TS 23.040 and shown in FIG. 11 bis for SMS over CS fallback in EPS. In an embodiment, referring to step 1 of this figure, the present invention provides:

At any time after the unsuccessful SM termination procedure, the UE may attach or communicate via NAS message in the PS and or CS domain again, in which case a Ready for SM message from the SGSN, the MME or MSC/VLR is sent to the HLR/HSS as described in TS 23.040.

Embodiments of the present invention in particular have the advantage, that the UE can be detected earlier than with the existing pure SMS over IP solution described in TS 23.204 or the existing SMS over CS fallback in EPS described in TS 23.272.

Embodiments of the present invention are not limited to the examples described above. For example, it would be possible to introduce new parameter(s) other than parameter(s) UNRI and/or MNRF. This would enable to manage the newly introduced parameter(s) independently of parameter(s) UNRI and/or MNRF; for example, this would enable to manage independently MNRF and the newly introduced corresponding parameter.

The principles of embodiments of the present invention can be extended to other Access Networks such as WLAN, WIMAX, Fixed Access, etc. where UE mobility does not result in an IP address change. An example is the WLAN technology coupled with Mobile IP IETF mobility mechanisms.

In this case, the mechanism will be similar as above described between MME and HLR/HSS, where the AAA Server would play the role of the MME. An unsuccessful delivery of a MS or UE known at the HLR/HSS would result in a message from the HLR/HSS to the AAA Server. An activity between the UE and the AAA Server can be detected, and depending on the type of activity (the UE must be reachable via IMS), the AAA Server can send a notification to the HLR/HSS.

In one aspect, in an embodiments, the present invention provides a method for the management of Short Message SM delivery in a mobile communication system comprising an Overlaying (e.g. IP-based or CS fallback in EPS based) SM delivery network accessed via a mobile or fixed Access Network AN which is transparent to the Overlaying SM Delivery procedure.

In an embodiment, said method comprises:
informing an AN entity capable of detecting User Equipment UE activity over said AN, of unsuccessful SM delivery attempt due to not reachable UE,
upon detection of UE activity over said AN for said UE, said AN entity informing an entity in charge of requesting new SM delivery attempt when said UE is again reachable.

In an embodiment, said User Equipment activity comprises Mobility Management activity and/or Session Management activity according to protocols between said UE and said AN entity.

In an embodiment, the unsuccessful SM delivery attempt to an UE is notified to a network user database that in turn requests from an AN entity capable of detecting User Equipment UE activity over said AN to be notified of the next UE activity.

In another aspect, in an embodiment, the present invention provides a method for the management of Short Message SM delivery in a mobile communication system comprising an Overlaying SM delivery network accessed via a mobile or fixed Access Network AN which is transparent to the Overlaying SM Delivery procedure, and wherein said Overlaying SM delivery network is IP-based, respectively CS fallback in Evolved Packet System based, and said system comprises a SMS-GMSC and an IP-SM Gateway IP-SM-GW, respectively SMS-GMSC and an MSC/VLR, providing protocol interworking between UE and Short Message Service Center SMS-SC.

In an embodiment, said method comprises:
If a network user database is notified by the SMS-GMSC, that a SMS has not been delivered to the UE due to the UE not available, the network user database sets the UE-Not-Reachable-for-IP UNRI, respectively Mobile Station Not Reachable Flag MNRF, parameter to a value TRUE,
if the UNRI, respectively MNRF, state in the network user database has changed, and if a AN entity capable of detecting UE activity over said AN is known in the network user database for the UE, the network user database sends a SM-DELIVERY-FAILURE-NOTIFICATION with a corresponding parameter MNRF, to the AN entity.

In an embodiment, said method comprises:
When the AN entity receives a SM-DELIVERY-FAILURE-NOTIFICATION with said corresponding parameter from the network user database, the AN entity stores said corresponding parameter.

In an embodiment, said method comprises:
If the AN entity has an Mobility Management context for that user, the AN entity sets said corresponding parameter to indicate the need to report to the network user database when the next contact with that UE is performed.

In an embodiment, said method comprises:
When the UE is becoming reachable again, the AN entity notifying the network user database of UE being reachable via the AN entity with a message Ready For SM.

In an embodiment, said method comprises:
upon receiving a message Ready for SM, the network user database triggering an SM Alert procedure towards the SM-SC via the SMS-IWMSC.

In an embodiment, said method comprises:
When the AN entity receives an indication that an UE is reachable, if the AN entity contains an MM context of the UE and said corresponding parameter for that UE is set, the AN entity sends a Ready for SM message with parameters IMSI or any parameter identifying the UE, and MS Reachable or any parameter indicating that the UE is reachable to the network user database and clears said corresponding parameter for that UE.

In an embodiment, said corresponding parameter corresponds to the UE-Not-Reachable-for-IP UNRI, respectively Mobile Station Not Reachable Flag MNRF, parameter.

In an embodiment:
said AN entity corresponds to a Mobility Management Entity MME in an AN comprising Evolved Packet Core EPC.

In an embodiment:
said network user database corresponds to an HSS/HLR.

In another aspect, in an embodiment, the present invention also provides a network entity for a mobile communication system comprising an Overlaying (IP-based or CS fallback over EPS based) SM delivery network accessed via a mobile or fixed Access Network AN which is transparent to the SM Delivery procedure.

In an embodiment, said network entity comprises:
means for informing an AN entity capable of detecting User Equipment UE activity over said AN, of an unsuccessful SM delivery attempt due to not reachable UE.

In an embodiment, said User Equipment activity comprises Mobility Management activity and/or Session Management activity according to protocols between said UE and said AN entity.

In an embodiment, said network entity corresponds to a network user database that is notified of the unsuccessful SM delivery attempt to an UE and that in turn requests from an AN entity capable of detecting User Equipment UE activity over said AN to be notified of the next UE activity.

In another aspect, in an embodiment, the present invention also provides a network entity for a mobile communication system comprising an Overlaying SM delivery network accessed via a mobile or fixed Access Network AN which is transparent to the SM Delivery procedure, and wherein said Overlaying SM delivery network is IP-based, respectively CS fallback in Evolved Packet System based, and said system comprises a SMS-GMSC and an IP-SM Gateway IP-SM-GW, respectively SMS-GMSC and MSC-VLR, providing protocol interworking between UE and Short Message Service Center SMS-SC.

In an embodiment, said network entity corresponds to a network user database comprising:
means for, if the network user database is notified by the SMS-GMSC, that a SMS has not been delivered to the UE due to the UE not available, setting the UE-Not- Reachable-for-IP UNRI, respectively Mobile Station Not Reachable Flag MNRF, parameter to a value TRUE, means for, if the UNRI, respectively MNRF, state in the network user database has changed, and if a AN entity capable of detecting UE activity over said AN is known in the network user database for the UE, sending a SM-DELIVERY-FAILURE-NOTIFICATION with a corresponding parameter to the AN entity.

In an embodiment, said corresponding parameter corresponds to the UE-Not-Reachable-for-IP UNRI, respectively Mobile Station Not Reachable Flag MNRF, parameter.

In an embodiment, said network entity comprises:
means for, upon reception from the AN entity of a message Ready for SM indicating that the UE is again reachable, triggering an SM Alert procedure towards the SM-SC via the SMS-IWMSC.

In an embodiment, said network entity corresponds to a subscriber database HLR/HSS.

In another aspect, in an embodiment, the present invention also provides another network entity for a mobile communication system comprising an Overlaying SM delivery network accessed via a (fixed or mobile Access Network AN which is transparent to the SM Delivery procedure.

In an embodiment, said network entity comprises:
means for receiving information as to unsuccessful SM delivery attempt due to non reachable UE,
means for, upon detection of UE activity over said AN for said UE, informing an entity in charge of requesting new SM delivery attempt when said UE is again reachable.

In an embodiment, said User Equipment activity comprises Mobility Management activity and/or Session Management activity according to protocols between said UE and said AN entity.

In an embodiment, in a system wherein the unsuccessful SM delivery attempt to an UE is notified to a network user database that in turn requests from an AN entity capable of detecting User Equipment UE activity over said AN to be notified of the next UE activity, said network entity corresponds to said AN entity.

In another aspect, in an embodiment, the present invention also provides a network entity for a mobile communication system comprising an Overlaying SM delivery network accessed via a mobile or fixed Access Network AN which is transparent to the SM Delivery procedure, and wherein said Overlaying SM delivery network is IP-based, respectively CS fallback in Evolved Packet System based, and said system comprises a SMS-GMSC and an IP-SM Gateway IP-SM-GW, respectively SMS-GMSC and MSC/VLR, providing protocol interworking between UE and Short Message Service Center SMS-SC.

In an embodiment, said network entity comprises:
means for, when the AN entity receives a SM-DELIVERY-FAILURE-NOTIFICATION with a corresponding parameter sent by the network user database when the state of UE-Not-Reachable-for-IP UNRI, respectively Mobile Station Not Reachable Flag MNRF, parameter has changed, storing said corresponding parameter.

In an embodiment, said network entity comprises:
means for, if the AN entity has an MM context for that user, setting said corresponding parameter to indicate the need to report to the network user database when the next contact with that UE is performed.

In an embodiment, said network entity comprises:
means for, when the UE is becoming reachable again, notifying the network user database of UE being reachable via the AN entity with a message Ready For SM.

In an embodiment, said network entity comprises:
means for, when the AN entity receives an indication that an UE is reachable, if the AN entity contains an MM context of the UE and said corresponding parameter for that UE is set, sending a Ready for SM message with parameters IMSI or any parameter identifying the UE, and MS Reachable or any parameter indicating that the UE is reachable to the network user database and clearing said corresponding parameter for that UE.

In an embodiment, said corresponding parameter corresponds to the UE-Not-Reachable-for-IP UNRI, respectively Mobile Station Not Reachable Flag MNRF, parameter.

In an embodiment, said network entity corresponds to a Mobility Management Entity MME in an AN comprising Evolved Packet Core EPC.

The detailed implementation of the above-mentioned means does not raise any special problem for a person skilled in the art, and therefore such means do not need to be more fully disclosed than has been made above, by their function, for a person skilled in the art.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for management of short message delivery in a mobile communication network, said method comprising:
a first mobile communication network entity, capable of receiving an indication of user equipment activity, including capable of receiving non-access stratum signalling from the user equipment, receiving from a second mobile communication network entity a request to report about reachability of the user equipment when the user equipment becomes reachable after an unsuccessful attempt to deliver a short message to the user equipment due to the user equipment being unreachable to receive the short message;
upon reception of an indication of user equipment activity, the first mobile communication network entity reporting about reachability of the user equipment to the second mobile communication network entity.

2. The method according to claim 1, wherein said short message delivery comprises SMS delivery over a generic IP-based access network using IMS capabilities.

3. The method according to claim 1, wherein the second mobile communication network entity comprises a user database of the mobile communication network.

4. The method according to claim 1, further comprising:
if the first mobile communication network entity has a mobility management context associated with the user equipment, the first mobile communication network entity setting a parameter to indicate a need to report about reachability of the user equipment.

5. The method according to claim 1, wherein the first mobile communication network entity comprises a mobility management entity.

6. The method according to claim 1, further comprising: upon reception of a notification regarding reachability of the user equipment to receive a short message, the second mobile communication network entity triggering a procedure to alert a service center.

7. The method according to claim 1, wherein said short message delivery comprises SMS delivery defined for circuit switched fallback in evolved packet system.

8. The method according to claim 1, wherein said short message delivery comprises SMS delivery wherein said first mobile communication network entity acts as relay for 3GPP TS 24.011 messages.

9. A mobile communication network entity comprising:
at least one processor; and
at least one memory including computer program code, the at least one memory and the computer program code configured to, with the at least one processor, cause the mobile communication network entity to at least:
after an unsuccessful attempt to deliver a short message to a user equipment, due to the user equipment being unreachable to receive the short message, request a mobile communication network entity, capable of receiving an indication of user equipment activity, including capable of receiving non-access-stratum signaling from the user equipment, to report about reachability of the user equipment when the user equipment becomes reachable, and
receive, from the mobile communication network entity to which the request was sent, a report about reachability of the user equipment when the user equipment becomes reachable.

10. The mobile communication network entity according to claim 9 comprising a user database of the mobile communication network.

11. The mobile communication network entity according to claim 9, wherein said short message delivery comprises SMS delivery over a generic IP-based access network using IMS capabilities.

12. The mobile communication network entity according to claim 9, wherein the at least one memory and computer program code are further configured to cause the mobile communication network entity to trigger a procedure to alert a service center after the user equipment becomes reachable to receive a short message.

13. The mobile communication network entity according to claim 9, wherein said short message delivery network comprises SMS delivery defined for circuit-switched fallback in evolved packet system.

14. The network entity according to claim 9, wherein said short message delivery comprises SMS delivery wherein said mobile communication network entity acts as relay for 3GPP TS 24.011 messages.

15. A mobile communication network entity comprising:
at least one processor; and
at least one memory including computer program code, the at least one memory and the computer program code configured to, with the at least one processor, cause the mobile communication network entity to at least:
receive an indication of user equipment activity, including receiving non-access stratum signaling from the user equipment; and
receive a request to report about reachability of a user equipment when the user equipment becomes reachable after an unsuccessful attempt to deliver a short message to the user equipment, due to the user equipment being unreachable to receive the short message,
upon reception of an indication of user equipment activity, report about reachability of the user equipment to a mobile communication network entity from which the request was received.

16. The mobile communication network entity according to claim 15, comprising a mobility management entity.

17. The mobile communication network entity according to claim 15, wherein said short message delivery comprises SMS delivery over a generic IP-based access network using IMS capabilities.

18. The mobile communication network entity according to claim 15, wherein the at least one memory and computer program code are further configured to cause the mobile communication network entity to, if the mobile communication network entity has a mobility management context associated with the user equipment, set a parameter to indicate a need to report about reachability of the user equipment when the user equipment becomes reachable.

19. The mobile communication network entity according to claim 15, wherein said short message delivery comprises SMS delivery defined for circuit-switched fallback in evolved packet system.

20. The network entity according to claim 15, wherein said short message delivery comprises SMS delivery wherein said mobile communication network entity acts as relay for 3GPP TS 24.011 messages.

21. A mobile communication network entity comprising:
at least one processor; and
at least one memory including computer program code, the at least one memory and the computer program code configured to, with the at least one processor, cause the mobile communication network entity to at least:
receive an indication of user equipment activity, including receiving non-access stratum signaling from the user equipment; and
perform a user activity notification procedure comprising:
determining if a request for a notification about reachability of a user equipment is received,
determining if an indication of user equipment activity is received which indicates that said user equipment is reachable,
determining if a mobility management context associated with said user equipment is available, and
sending a notification indicating reachability of said user equipment if said indication is received and if the mobility management context associated with said user equipment is available.

22. The mobile communication network entity according to claim 21, comprising a mobility management entity.

23. The mobile communication network entity according to claim 21, wherein said notification includes international mobile subscriber identity information.

24. The mobile communication network entity according to claim 21, wherein said indication includes an attach request message from said user equipment.

25. The mobile communication network entity according to claim 21, wherein said indication includes a non-access stratum message from said user equipment.

26. The mobile communication network entity according to claim 21, wherein the at least one memory and computer program code are further configured to cause the mobile communication network entity to perform a user activity notification procedure comprising:

after the user equipment reachability notification request is received and availability of an mobility management context associated with said user equipment is determined, setting a user equipment reachability parameter to indicate a need to report about reachability of said user equipment when said user equipment is reachable, and clearing said user equipment reachability parameter if said indication is received which indicates said user equipment is reachable.

27. The mobile communication network entity according to claim 21, wherein said user activity notification procedure further comprises sending said notification indicating reachability of the user equipment to a user database of the mobile communication network.

28. A method comprising:

performing, at a mobile communication network entity capable of receiving an indication of user equipment activity, including capable of receiving non-access stratum signaling from the user equipment, a user activity notification procedure comprising:

determining if a request for a notification about reachability of a user equipment is received, determining if an indication of user equipment activity is received which indicates that said user equipment is reachable, determining if a mobility management context associated with said user equipment is available, and sending a notification indicating reachability of said user equipment if said indication is received and if the mobility management context associated with said user equipment is available.

29. The method according to claim 28, wherein the mobile communication network entity comprises a mobility management entity.

30. The method according to claim 28, wherein said notification includes international mobile subscriber identity information.

31. The method according to claim 28, wherein said indication includes an attach request message from said user equipment.

32. The method according to claim 28, wherein said indication includes a non-access stratum message from said user equipment.

33. The method according to claim 28, further comprising:

after the user equipment reachability notification request is received and availability of a mobility management context associated with said user equipment is determined, setting a user equipment reachability parameter to indicate a need to send a report about reachability of said user equipment when said user equipment is reachable, and if said indication is received which indicates said user equipment is reachable, sending said notification indicating reachability of said user equipment and clearing said user equipment reachability parameter.

34. The method according to claim 28, wherein said user activity notification procedure further comprises sending said notification indicating reachability of the user equipment to a user database of the mobile communication network.

* * * * *